(12) United States Patent
Ye et al.

(10) Patent No.: US 6,773,107 B2
(45) Date of Patent: Aug. 10, 2004

(54) SOFT TRANSLATING CONTACT LENS FOR PRESBYOPIA

(75) Inventors: Ming Ye, Fort Worth, TX (US); Xiaoxiao Zhang, Fort Worth, TX (US)

(73) Assignee: Novartis AG, Basel (CH)

( * ) Notice: Subject to any disclaimer, the term of this patent is extended or adjusted under 35 U.S.C. 154(b) by 243 days.

(21) Appl. No.: 09/911,333

(22) Filed: Jul. 23, 2001

(65) Prior Publication Data

US 2002/0021410 A1 Feb. 21, 2002

Related U.S. Application Data

(60) Provisional application No. 60/226,055, filed on Aug. 17, 2000.

(51) Int. Cl.$^7$ ................................................ G02C 7/04
(52) U.S. Cl. ...................................................... 351/161
(58) Field of Search ............................ 351/161, 160 R, 351/160 H, 162, 177

(56) References Cited

U.S. PATENT DOCUMENTS

| | | | |
|---|---|---|---|
| 4,573,775 A | | 3/1986 | Bayshore .................... 351/161 |
| 4,618,229 A | | 10/1986 | Jacobstein et al. .......... 351/161 |
| 5,071,244 A | | 12/1991 | Ross ........................... 351/161 |
| 5,141,301 A | | 8/1992 | Morstad ..................... 351/161 |
| 5,296,880 A | * | 3/1994 | Webb ......................... 351/161 |
| 5,635,998 A | | 6/1997 | Baugh ........................ 351/161 |
| 5,971,542 A | * | 10/1999 | Volker et al. ............... 351/161 |
| 2003/0095231 A1 | * | 5/2003 | Ezekiel ....................... 351/161 |

FOREIGN PATENT DOCUMENTS

| | | | |
|---|---|---|---|
| EP | 2 033 101 A | | 5/1980 |
| EP | WO 99 23527 A | | 5/1999 |
| FR | 2 582 416 | * | 5/1985 |
| WO | WO 84/04401 | | 11/1984 |
| WO | WO 01/44860 | | 6/2001 |

OTHER PUBLICATIONS

International Search Report PCT/EP01/09465 filed Aug. 16, 2001.

* cited by examiner

Primary Examiner—Jordan M. Schwartz
(74) Attorney, Agent, or Firm—Jian S. Zhou; Robert J. Gorman; R. Scott Meece

(57) ABSTRACT

A contact lens has top, a bottom, a rotational axis, an inner surface and an opposite outer surface having a plurality of zones. The plurality of zones include an optical zone, a ridge zone and a transition zone. The optical zone has a lower edge and includes a distance vision zone and a near vision zone. The distance vision zone has a first radius of curvature that provides distance vision correction. The distance vision zone also has a first area that is sufficient to overlay a substantial portion of a pupil of a user and is disposed in a first position within the optical zone so that the user's pupil is substantially subtended by the distance vision zone when the user is gazing at a substantially horizontal point. The near vision zone is substantially concentric with the rotational axis and extends radially outward from the distance vision zone. The near vision zone has a second radius of curvature that provides near vision correction and has a second area that is sufficient to overlay a substantial portion of a pupil of a user. The near vision zone is disposed in a second position within the optical zone so that the user's pupil is substantially subtended by the near vision zone when the user is gazing at a near vision point below the substantially horizontal point. The ridge zone, has an upper edge and a lower edge and is disposed below the optical zone. The ridge zone includes a latitudinal ridge portion that extends outwardly from the outer surface to enable engagement with a lower eyelid of a user and thereby provide vertical translation support for the contact lens when being worn by the user. The transition zone extends from the lower edge of the optical zone to the upper edge of the ridge zone and provides a smooth transition from the ridge zone to the optical zone.

23 Claims, 4 Drawing Sheets

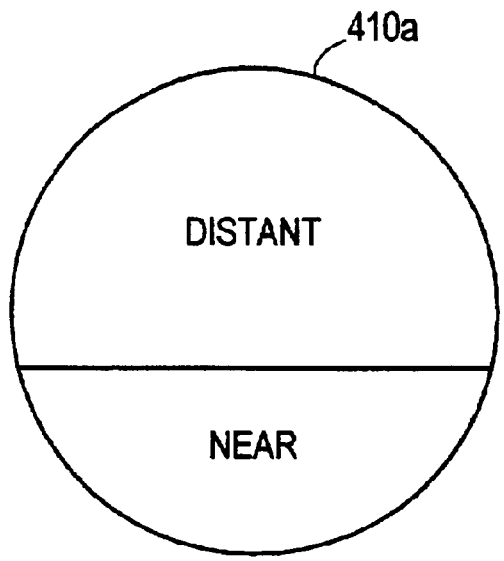 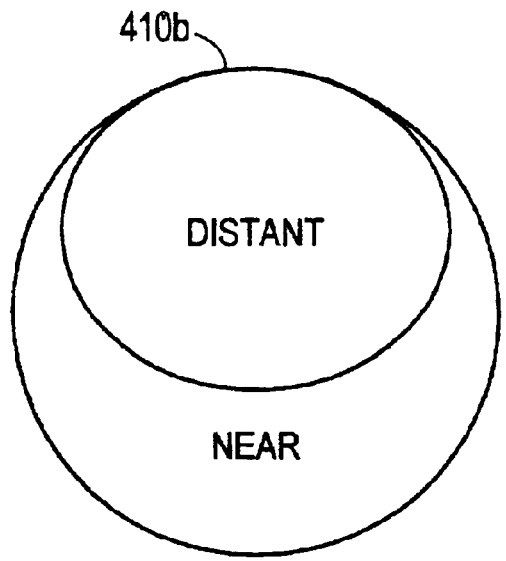
FIG. 4A  FIG. 4B
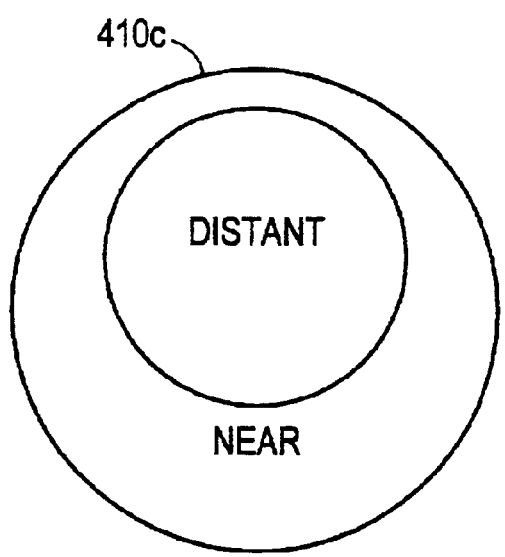
FIG. 4C

SOFT TRANSLATING CONTACT LENS FOR PRESBYOPIA

This application claims the benefit under 35 U.S.C. §119(e) of U.S. provisional patent application No. 60/226,055 filed Aug. 17, 2000.

BACKGROUND OF THE INVENTION

1. Field of the Invention

The present invention relates to optics and, more specifically, to soft contact lenses.

2. Description of the Prior Art

Contact lenses are widely used for many different types of vision deficiencies. These include defects such as near-sightedness and far-sightedness (myopia and hypermetropia, respectively), and defects in near range vision usually associated with aging (presbyopia). Presbyopia occurs as a person ages when the lens of eye begins to crystalize and lose its elasticity, eventually resulting in the eye losing the ability to focus on nearby objects.

Some presbyopic persons have both near vision and far vision defects, requiring bifocal lenses to properly correct their vision. Many people prefer wearing contact lenses to correct their vision rather than bifocal eye glasses.

A typical single vision contact lens has a focus, which is the point on which parallel rays of light focus when the lens is placed perpendicular to the parallel rays, and an optical axis, which is an imaginary line drawn from the focus to the center of the lens. A posterior surface fits against the cornea and an opposite anterior surface has a vision surface that focuses light to correct the eye's vision. In the case of a typical spherical lens, the vision surface has a single radius of curvature that is the distance from any point on the vision surface to a point on the optical axis referred to as the center of curvature. A bifocal lens has at least two vision surfaces on the anterior surface of the lens: a distance vision surface, for gazing at far off objects, and a near vision surface, for gazing at close objects (e.g., while reading).

Effective use of a bifocal contact lens requires translation of the eye between vision surfaces when the eye changes from gazing at an object at a distance to gazing at a nearby object. In such a situation, the pupil must move from being subtended by the distance vision surface to being subtended by the near vision surface.

Contact lenses generally are either hard lenses or soft lenses. Hard lenses tend to be less comfortable than soft lenses and, therefore, are usually worn for shorter periods of time.

While there are many designs for hard bifocal contact lenses, soft contact lenses have difficulty translating across the surface of the eye when the visual direction of the eye changes from horizontal gaze distance vision to down gaze near vision. This is due to the ability of a soft contact lens to conform closely to the shape of the cornea. For this reason, soft translating bifocal contact lenses are uncommon. Thus, users who desire bifocal contact lenses are usually limited to using the more uncomfortable hard lenses, while those who wish to wear soft contact lenses are usually limited to wearing monofocal lenses.

Therefore, there is a need for a soft bifocal contact lens that supports translation across the surface of the eye when the eye changes position from distance vision to near vision.

SUMMARY OF THE INVENTION

The disadvantages of the prior art are overcome by the present invention which, in one aspect, is a contact lens having top, a bottom, a rotational axis, an inner surface and an opposite outer surface, the outer surface including a plurality of zones. The plurality of zones include an optical zone, a ridge zone, a transition zone and a bevel zone. The optical zone has a lower edge, and includes a distance vision zone and a near vision zone.

The distance vision zone has a first radius of curvature that provides distance vision correction. The distance vision zone also has a first area that is sufficient to overlay a substantial portion of a pupil of a user and is disposed in a first position within the optical zone so that the user's pupil is substantially subtended by the distance vision zone when the user is gazing at a substantially horizontal point.

The near vision zone is substantially concentric with the rotational axis and extends radially outward from the distance vision zone. The near vision zone has a second radius of curvature that provides near vision correction and has a second area that is sufficient to overlay a substantial portion of a pupil of a user. The near vision zone is disposed in a second position within the optical zone so that the user's pupil is substantially subtended by the near vision zone when the user is gazing at a near vision point below the substantially horizontal point.

The ridge zone has an upper edge and a lower edge and is disposed below the optical zone. The ridge zone includes a latitudinal ridge portion that extends outwardly from the outer surface to enable engagement with a lower eyelid of a user and thereby provide vertical translation support for the contact lens when being worn by the user. The transition zone extends from the lower edge of the optical zone to the upper edge of the ridge zone and provides a smooth transition from the ridge zone to the optical zone.

In another aspect, the invention is a method of producing a master cast used in making a contact lens mold. A blank, having an outer surface, is rotated about a first rotational axis and at least one first surface is cut onto the outer surface of the blank.

The blank is also rotated about a plurality of secondary rotational axes, wherein each secondary rotational axis is different from the first rotational axis. A portion of a ridge-off surface is cut from the outer surface of the blank while it is rotating at each secondary rotational axis. Thus, a ridge-off surface is formed once the blank has been rotated about each of the plurality of secondary rotational axes.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 4A is a front elevational view of an optical zone having horizontal distance vision and near vision zones.

FIG. 4B is a front elevational view of an optical zone having a non-circular distance vision zone.

FIG. 4C is a front elevational view of an optical zone having circular distance vision and near vision zones.

DETAILED DESCRIPTION OF THE INVENTION

Figures 1A, 1B:
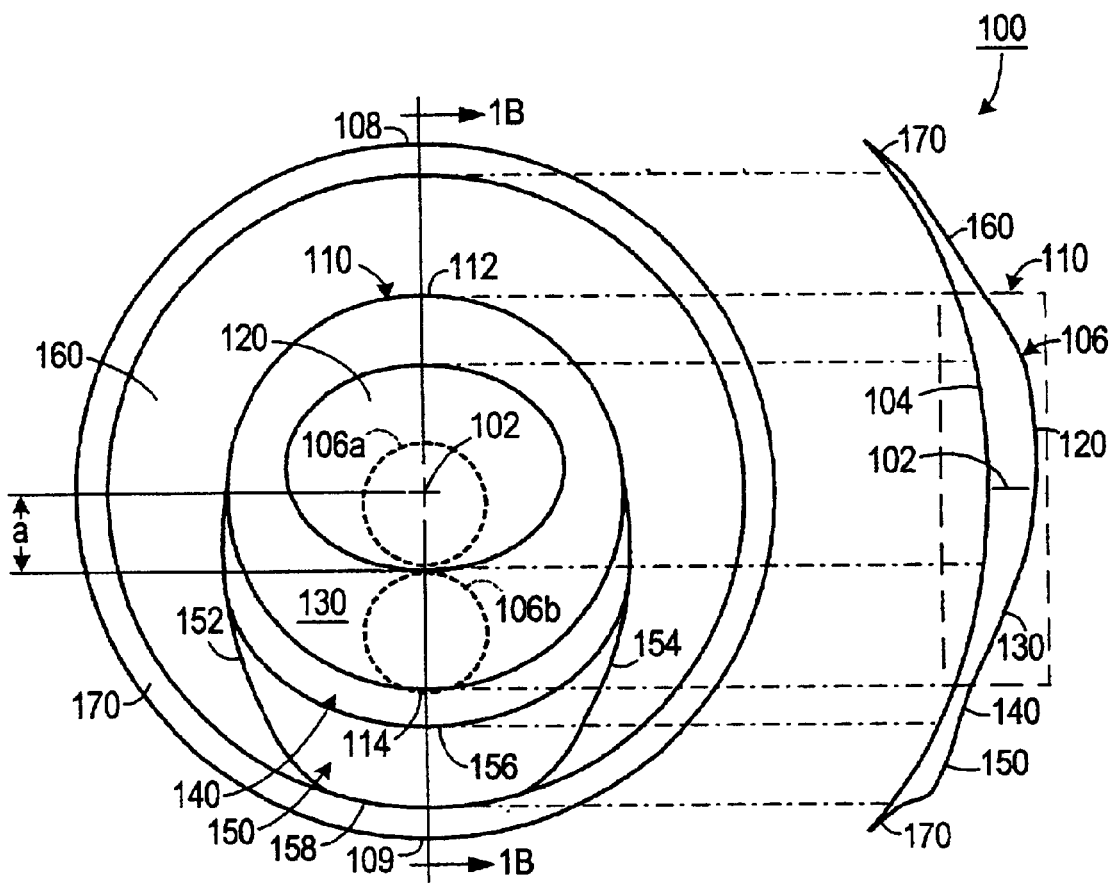
FIG. 1A is a front elevational view of one embodiment of the invention.
FIG. 1B is a cross-sectional view, exaggerated along the horizontal axis, of the embodiment shown in FIG. 1A, taken along line 1B—1B.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1C:
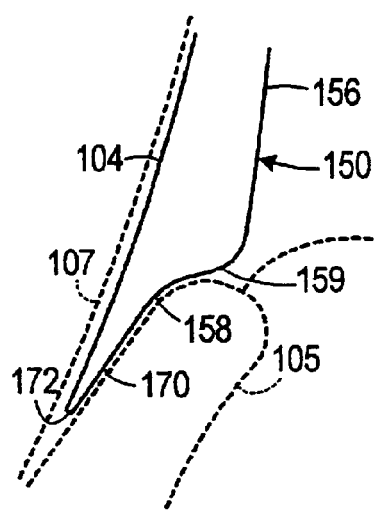
FIG. 1C is a detail view of a portion of FIG. 1B.

As shown in FIGS. 1A–1C, one embodiment of the invention is a contact lens 100 having top 108, a bottom 109, a rotational axis 102, an inner surface 104 and an opposite outer surface 106. The outer surface 106 includes an optical zone 110, a transition zone 140, a ridge zone 150, a ridge-off zone 160 and a bevel zone 170. The optical zone 110 has a lower edge 114 and includes a distance vision zone 120 and a near vision zone 130.

The distance vision zone 120 has a first radius of curvature that provides distance vision correction for the user. The area of the distance vision zone 120 is sufficient to overlay a substantial portion of a pupil 106a of a user. The distance vision zone 120 is disposed so that the user's pupil 106a is substantially subtended by the distance vision zone 120 when the user is gazing at a substantially horizontal point. Typically, the distance vision zone 120 will be offset from the rotational axis 102. This is so that the pupil 106 will be substantially subtended by the near vision zone 130 when the eye 107 is looking down (e.g., when the eye 107 is engaged in reading). The distance a from the center 102 to the bottom of the distance vision zone 120 should be the minimum distance that allows the pupil 106a to be substantially subtended by the distance vision zone 120 when gazing at the horizon. This will may result in the distance vision zone 120 having an oval shape.

The near vision zone 130 is substantially concentric with the rotational axis 102 and extends radially outward from the distance vision zone 120. The near vision zone 130 has a second radius of curvature that provides near vision correction for the user. The area of the near vision zone 130 is sufficient to overlay a substantial portion of the pupil 106b. The near vision zone 130 is disposed so that the user's pupil 106b is substantially subtended by the near vision zone 130 when the user is gazing at a near vision point below the substantially horizontal point (e.g., while reading). Both the distance vision zone 120 and near vision zone 130 could be place either on the inner surface 104 or the outer surface 106 of the lens 100.

The ridge zone 150 provides vertical translation support for the lens 100. The ridge zone 150 has an upper edge 156, a lower edge 158, a first side edge 152 and a second side edge 154. The ridge zone 150 is disposed below the optical zone 110. A latitudinal ridge portion 159 extends outwardly from the outer surface 106 to enable engagement with the user's lower eyelid 105. Thus, when the eye 107 moves in a downward direction, the ridge portion 159 engages the lower eyelid 105 and supports the lens 100, thereby allowing translation of the lens 100 across the surface of the eye 107.

The transition zone 140 provides a smooth transition from the ridge zone 150 to the optical zone 110. The transition zone 140 extends from the lower edge 114 of the optical zone 110 to the upper edge of the ridge zone 156.

Typically, to provide corneal coverage, the lens 100 also includes a ridge-off zone 160, which extends outwardly from the top edge 112 of the optical zone 110, the first side edge 152 of the ridge zone 150 and the second side edge 154 of the ridge zone 150. The ridge-off zone 160 should have sufficient area so that the ridge-off zone 150, the optical zone 110, the ridge zone 150 and the transition zone 140 cover substantially all of a user's cornea. The ridge-off zone 160 adds lens rotational stability and improves the comfort of the lens 100. For added comfort, the lens 100 may also include a bevel zone 170, extending radially outward from the ridge-off zone 160 and the lower edge 158 of the ridge zone 150, that tapers to a narrow end 172.

A lens 100 according to the invention typically would be made from a soft contact lens material, such as a silicon hydro-gel or HEMA. Although, it will be understood that any lens described above comprising any soft contact lens material would fall within the scope of the invention.

A contact lens according to the invention could be constructed using a conventional contact lens molding process. With such a process, a mold is made from a master cast of the exterior surface and a master cast of the interior surface. The master cast of the exterior surface could be formed on a conventional computer-controlled cutter in conjunction with a lathe, of the type conventionally used in making master casts of contact lenses.

Figure 2A:
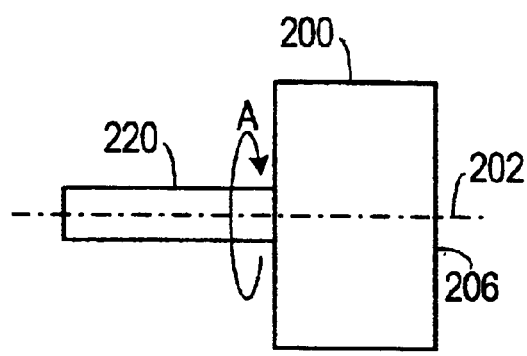
FIG. 2A is a side elevational view of an uncut master cast blank mounted on a spindle.
Figure 2B:
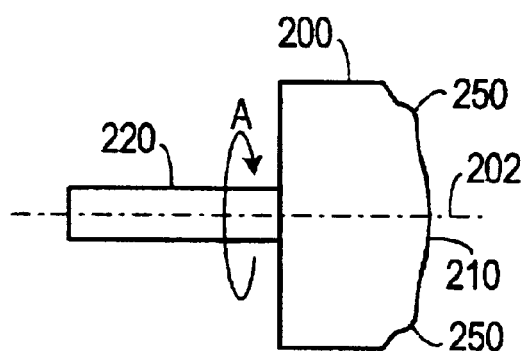
FIG. 2B is a is a side elevational view of the master cast blank of FIG. 2A after a first surface has been cut from the master cast blank.

As shown in FIG. 2A, a master cast blank 200 is mounted on a spindle 220 and is rotated around a rotational axis 202 in a preselected direction A. Initially, as shown in FIG. 2B, at least one first surface 210 is cut onto the outer surface 206 of the blank 200. The first surface 210 would include the optical zone, the transition zone, the ridge zone 250 and the bevel zone. At this point, the ridge zone 250 would extend circularly about the outer surface of the blank 200. The various vision surfaces would be cut into the blank 200 by carefully controlling the depth of the cutting instrument (as with a conventional computer control mechanism) as the blank 200 rotates.

Figure 2C:
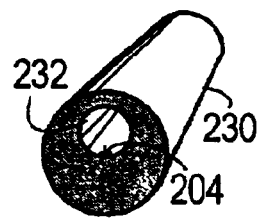
FIG. 2C is a perspective view of a spacer used to offset the axis of rotation of the spindle and master cast blank.
Figure 2D:
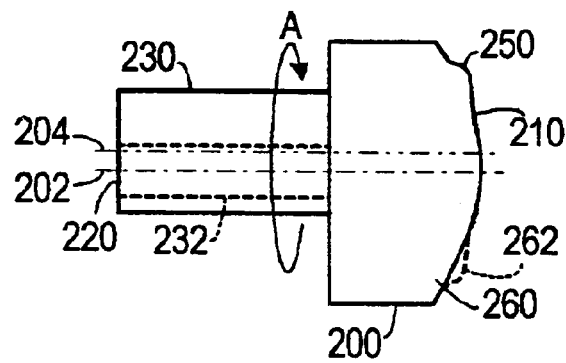
FIG. 2D is a side elevational view of the master cast blank and the spindle with the spacer of FIG. 2C applied thereto after a ridge-off surface has been cut from the master cast blank.
Figure 3A:
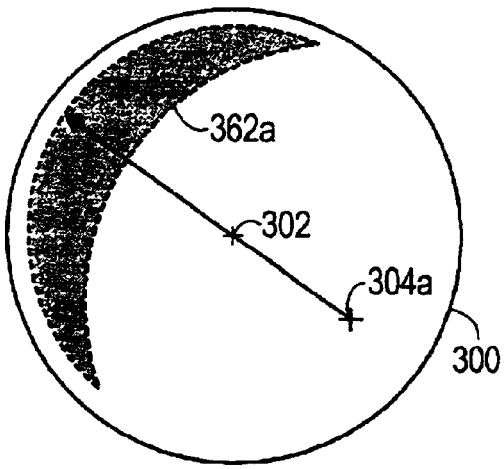
FIG. 3A is a front elevational view of a master cast blank after a first ridge-off zone has been cut.
Figure 3B:
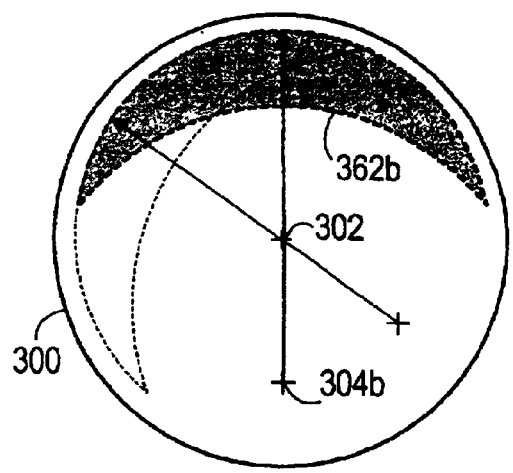
FIG. 3B is a front elevational view of a master cast blank after a second ridge-off zone has been cut.
Figure 3C:
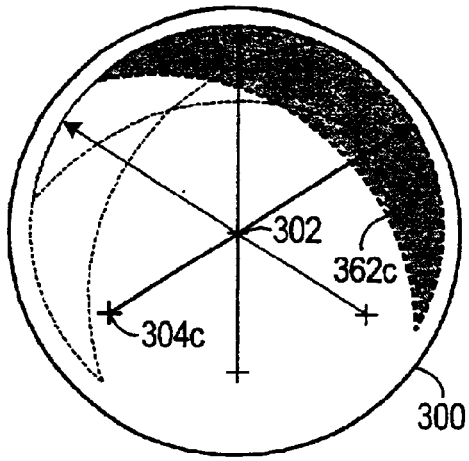
FIG. 3C is a front elevational view of a master cast blank after a third ridge-off zone has been cut.
Figure 3D:
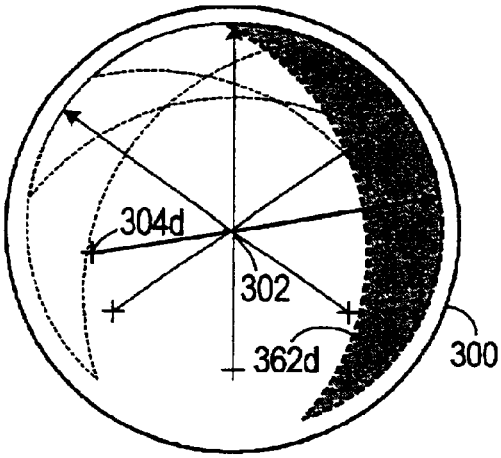
FIG. 3D is a front elevational view of a master cast blank after a fourth ridge-off zone has been cut.
Figure 3E:
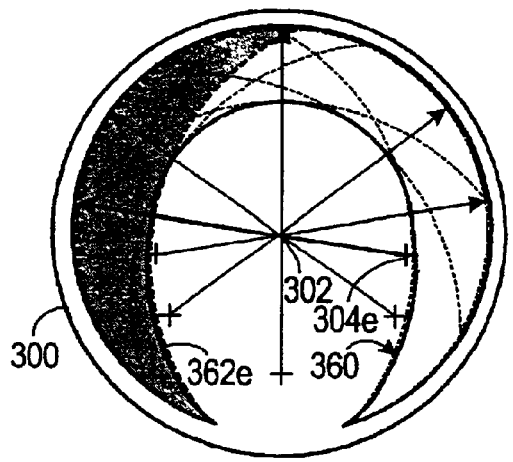
FIG. 3E is a front elevational view of a master cast blank after a fifth ridge-off zone has been cut.

Depending on the precision of the cutting instrument, cutting the ridge-off zone may require offsetting the axis of rotation of the blank 200. This is done by adding a spacer 230, as shown in FIG. 2C, to the spindle 220. The spacer 230 is essentially an elongated sleeve having an opening 232 passing longitudinally therethrough. The opening 232 is complementary in shape to the spindle 220 so as to allow the spindle 220 to fit within the spacer 230. The spacer 230 has a secondary rotational axis 204 so that when the spindle 220 is inserted in the spacer 230, the blank 200 rotates about the secondary rotational axis 204, which is offset from the rotational axis 202 of the spindle 220. By changing the orientation of the spindle 220 within the spacer 230, the blank will have a plurality of secondary offset rotational axes. Each different offset rotational axis causes the blank 200 to rotate with a different eccentric orbit so that a different portion of the outermost edge of the blank 400 is furthest outward during the orbit. Thus, when the spindle 220 is placed within the spacer 230 as shown in FIG. 2D, the portion 260 of the blank 200 opposite the rotational axis 202 of the spindle 220 will orbit farthest from the secondary offset rotational axis 204. While rotating in this fashion, a crescent-shaped portion 260 may be cut into the blank 200 removing undesired material 262 from the blank, thus forming a portion of the ridge-off zone.

As is shown in FIGS. 3A–3E, the complete ridge-off zone 360 is formed by rotating the blank 300 about a plurality of secondary axes 304a–e (each being offset from the rotational axis 302 of the blank) and cutting a plurality of crescent-shaped portions 362a–e from the blank 300. Generally, cutting five crescent-shaped portions 362 will result in the formation of the ridge-off zone 360, although cutting more crescent-shaped portions 362, using a corresponding number of offset axes 304 of rotation, will result in a smoother ridge-off zone 360.

As will be readily appreciated by those of skill in the art, many different shapes of vision zones are possible with the present invention. Three illustrative examples of such shapes 410a–c are shown in FIGS. 4A–4C.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A contact lens having top, a bottom, a rotational axis, an inner surface and an opposite outer surface, the outer surface including a plurality of zones, comprising:
   a. an optical zone having a lower edge, including:
      i. a distance vision zone having a first radius of curvature that provides distance vision correction and having a first area that is sufficient to overlay a substantial portion of a pupil of a user and disposed in a first position within the optical zone so that the user's pupil is substantially subtended by the distance vision zone when the user is gazing at a substantially horizontal point; and
      ii. a near vision zone, extending radially outward from the distance vision zone, having a second radius of curvature that provides near vision correction and having a second area that is sufficient to overlay a substantial portion of a pupil of a user and disposed in a second position within the optical zone so that the user's pupil is substantially subtended by the near vision zone when the user is gazing at a near vision point below the substantially horizontal point;
   b. a ridge zone, having an upper edge and a lower edge and disposed below the optical zone, that includes a latitudinal ridge portion extending outwardly from the outer surface to enable engagement with a lower eyelid of a user and thereby provide vertical translation support for the contact lens when being worn by the user;
   c. a transition zone extending from the lower edge of the optical zone to the upper edge of the ridge zone that provides a smooth transition from the ridge zone to the optical zone; and
   d. a bevel zone, extending radially outward from a ridge-off zone and the lower edge of the ridge zone, that tapers to a narrow end.

2. A contact lens of claim 1, wherein the contact lens comprises a soft contact lens material.

3. The contact lens of claim 1, wherein the distance vision zone has a center that is offset from the rotational axis of the contact lens.

4. The contact lens of claim 1, wherein the distance vision zone has an oval shape.

5. The contact lens of claim 1, wherein the optical zone includes a top edge and the ridge zone comprises a first side edge and a second side edge, wherein the ridge-off zone extends outwardly from the top edge of the optical zone, first side edge of the ridge zone and the second side edge of the ridge zone, and wherein the ridge-off zone has sufficient area so that the ridge-off zone, the optical zone, the ridge zone and the transition zone cover substantially all of a user's cornea.

6. The contact lens of claim 1, comprising a soft contact lens material.

7. The contact lens of claim 6, wherein the soft contact lens material comprises a silicon hydro-gel.

8. The contact lens of claim 6, wherein the soft contact lens material comprises HEMA.

9. The contact lens of claim 3, wherein the distance vision zone has an oval shape.

10. The contact lens of claim 1, wherein the near vision zone is substantially concentric with the rotational axis and extends radially outward from the distance vision zone.

11. The contact lens of claim 9, wherein the near vision zone is substantially concentric with the rotational axis and extends radially outward from the distance vision zone.

12. The contact lens of claim 9, wherein the optical zone includes a top edge and the ridge zone comprises a first side edge and a second side edge, wherein the ridge-off zone extends outwardly from the top edge of the optical zone, first side edge of the ridge zone and the second side edge of the ridge zone, and wherein the ridge-off zone has sufficient area so that the ridge-off zone, the optical zone, the ridge zone and the transition zone cover substantially all of a user's cornea.

13. The contact lens of claim 3, wherein the optical zone includes a top edge and the ridge zone comprises a first side edge and a second side edge, wherein the ridge-off zone extends outwardly from the top edge of the optical zone, first side edge of the ridge zone and the second side edge of the ridge zone, and wherein the ridge-off zone has sufficient area so that the ridge-off zone, the optical zone, the ridge zone and the transition zone cover substantially all of a user's cornea.

14. The contact lens of claim 10, wherein the optical zone includes a top edge and the ridge zone comprises a first side edge and a second side edge, wherein the ridge-off zone extends outwardly from the top edge of the optical zone, first side edge of the ridge zone and the second side edge of the ridge zone, and wherein the ridge-off zone has sufficient area so that the ridge-off zone, the optical zone, the ridge zone and the transition zone cover substantially all of a user's cornea.

15. The contact lens of claim 11, wherein the optical zone includes a top edge and the ridge zone comprises a first side edge and a second side edge, wherein the ridge-off zone extends outwardly from the top edge of the optical zone, first side edge of the ridge zone and the second side edge of the ridge zone, and wherein the ridge-off zone has sufficient area so that the ridge-off zone, the optical zone, the ridge zone and the transition zone cover substantially all of a user's cornea.

16. The contact lens of claim 3, comprising a soft contact lens material.

17. The contact lens of claim 9, comprising a soft contact lens material.

18. The contact lens of claim 10, comprising a soft contact lens material.

19. The contact lens of claim 11, comprising a soft contact lens material.

20. The contact lens of claim 12, comprising a soft contact lens material.

21. The contact lens of claim 13, comprising a soft contact lens material.

22. The contact lens of claim 14, comprising a soft contact lens material.

23. The contact lens of claim 15, comprising a soft contact lens material.

* * * * *